May 4, 1948.    E. CAIRNS    2,440,845
BLOCKING APPARATUS FOR FORMING CROWNS OF HEAD GEAR AND OTHER ARTICLES
Filed May 16, 1946    2 Sheets-Sheet 2
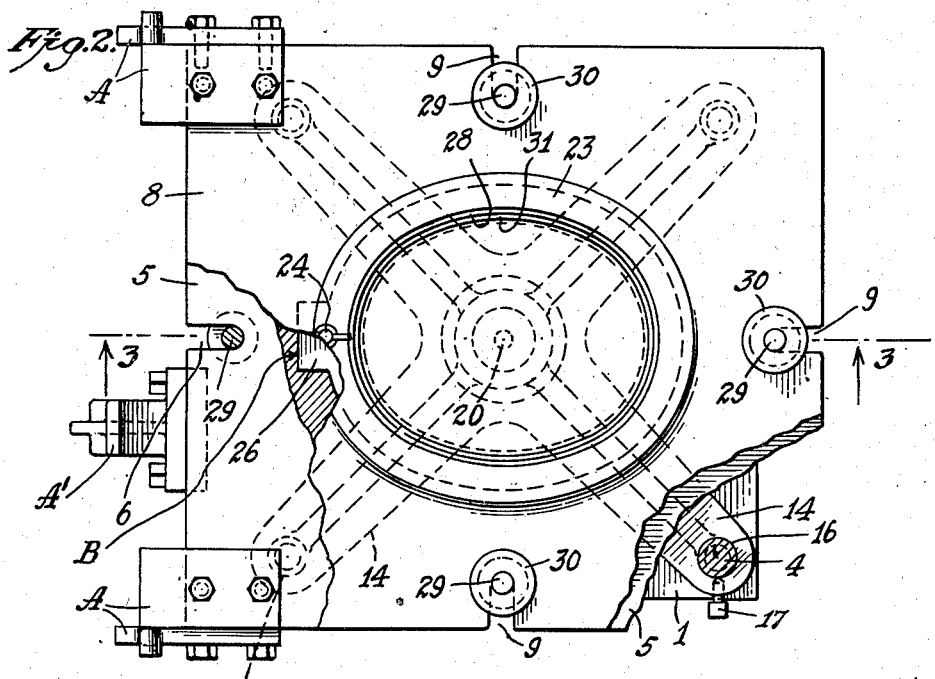
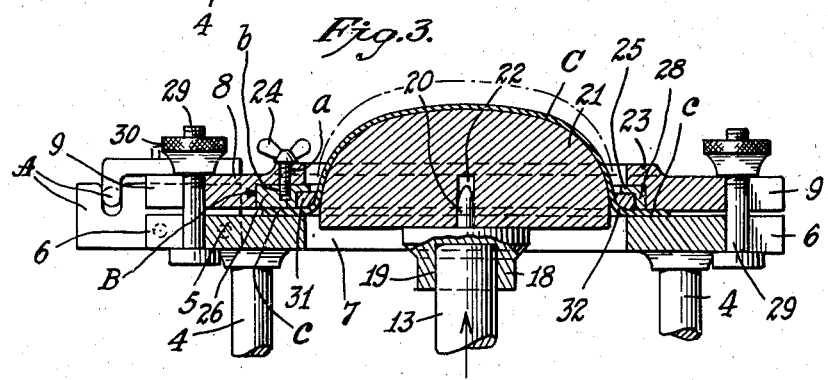
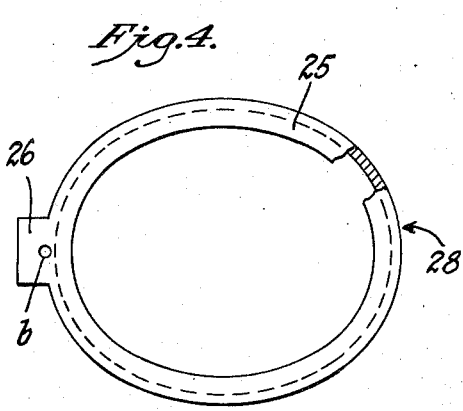
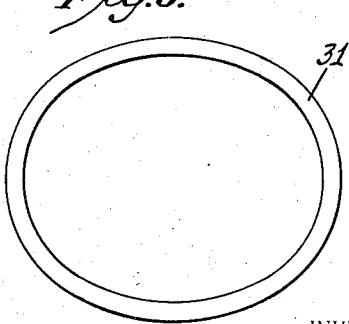
INVENTOR:
Edward Cairns,
BY
His ATTORNEY.

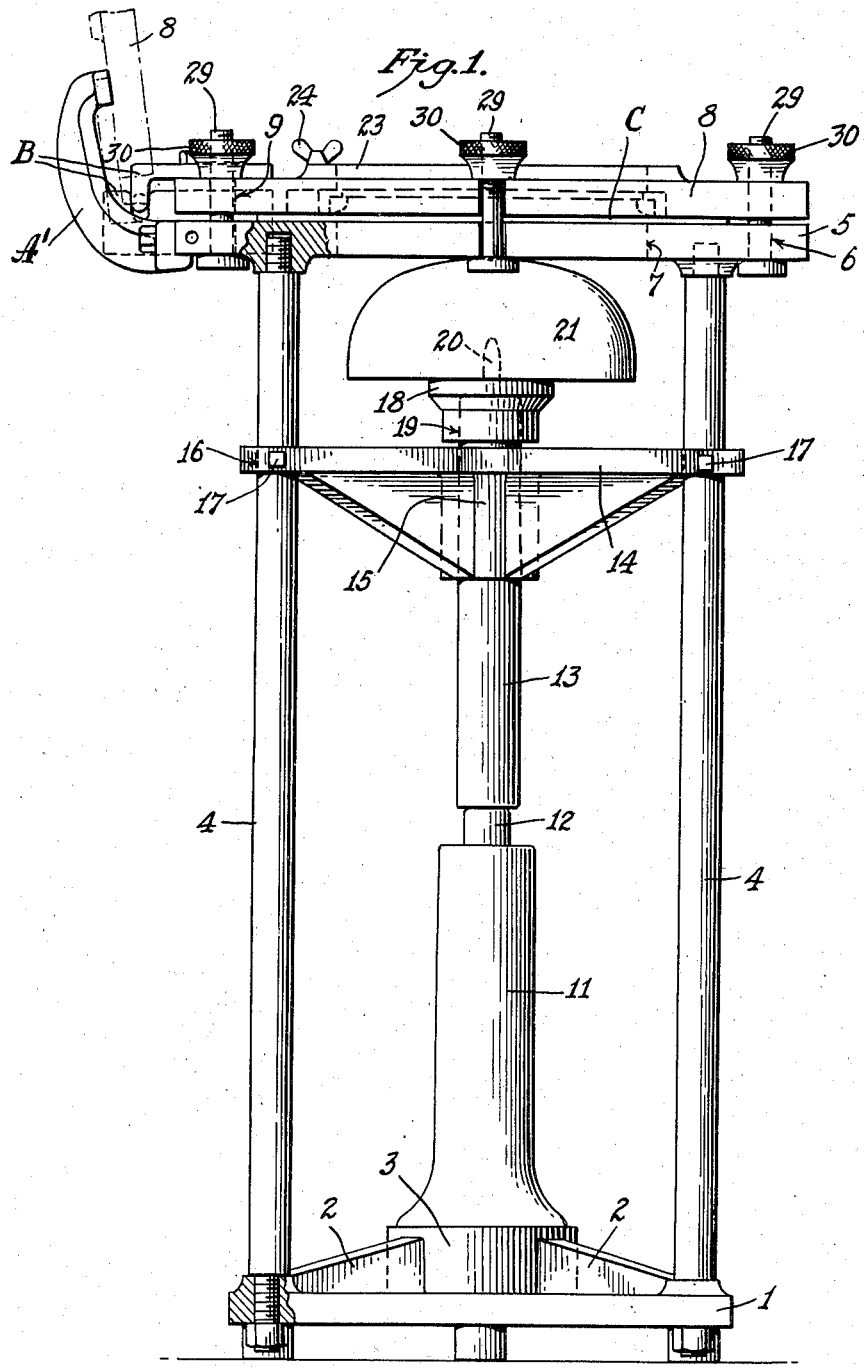

Patented May 4, 1948

2,440,845

UNITED STATES PATENT OFFICE 2,440,845

BLOCKING APPARATUS FOR FORMING CROWNS OF HEADGEAR AND OTHER ARTICLES

Edward Cairns, Montclair, N. J.

Application May 16, 1946, Serial No. 670,122

6 Claims. (Cl. 223—12)

This invention relates to the forming of hats, helmets and other cupped or dome shaped articles as bomber noses, automobile headlight housings and the like and has for its particular objects the provision of a compact, inexpensive and sturdy apparatus in which such articles in a wide variety of desired sizes can be expeditiously, cheaply and accurately formed from various moldable sheet materials, such for example as leather, plastics, laminated wood, fiber and the like. Other objects of the invention will hereinafter appear.

Heretofore, in the production of hats, helmets and like cupped articles it has been customary to stretch the material employed for the purpose over a suitable forming mold or die and when the stretching operation was completed to allow the resultant shape to remain in the press on the forming mold to which it was fastened, usually by tacking the same thereto, until the shape so formed dried out sufficiently to take a permanent set. Since such setting period varied from about ten minutes in the case of a plastic to some twenty-four hours in the case of leather, during which time the press could not be used for the production of additional shapes, the output of the presses employed was correspondingly limited.

My investigations have led to the discovery that it is possible to expeditiously produce the crowns of hats, helmets and other articles in the various sizes commonly required, all without sacrificing any of the advantages inherent in such prior methods of shaping such articles through the utilization of the apparatus and method hereinafter described which admits of the immediate removal of the shape together with the forming block upon the completion of the pressing operation irrespective of the time required for the material employed to take a permanent set.

My invention is fully set forth in the following detailed description and drawings forming a part thereof in which, Figure 1 is an elevation, partly in section, of a pressing machine for blocking helmets embodying a preferred form of my invention and showing the parts in their adjusted position following the insertion of the blank therein from which the helmet is to be formed;

Figure 2 is a plan view partially broken away of the same apparatus but showing the parts in an intermediate position and the blank partially stretched;

Figure 3 is a fragmentary vertical section taken on the line 3—3 of Figure 2;

Figure 4 is a plan view of the master adapter employed in such machine; and

Figure 5 is a plan view of the retainer ring employed to maintain the stretched shape on its mold after its removal from the pressing machine.

Referring to the drawings and the construction shown therein, the reference numeral 1 designates the base plate of my improved machine, 2 the reinforcing ribs formed thereon and 3 a circular central elevated supporting boss for an hydraulic jack hereinafter described. Four vertical pillars 4 are bolted or otherwise anchored to the base plate, the same serving to support a platen member 5 with which they are preferably in threaded engagement. Said platen has four marginal slots 6 formed therein preferably disposed equi-distant from the respective corners thereof and also has a central aperture 7 adapted to admit of a forming block being completely projected therethrough as hereinafter explained.

A pressure plate 8 is hinged to the platen by means of hinges A, such pressure plate being provided with marginal slots 9, corresponding to said slots 6, with which they are adapted to register when the platen and pressure plate are folded into parallelism with each other.

An hydraulic jack element 11 having a piston element 12 which serves to actuate a plunger member 13, is mounted on said boss 3. Diagonally extending guides 14, carrying a collar or tubular guide member 15 which has a slidable fit with said plunger 13 and is provided with apertures 16 adapted to receive said pillars 4, are rigidly secured to the latter at any desired level by means of cap screws 17.

A cap-piece 18, having a flat top surface, is provided with a central recess 19 adapted to receive the upper end of the plunger 13 on which it is mounted. Said cap-piece has a vertically projecting central pin 20 rigidly secured thereto and the same serves to center a forming block 21, when the same is mounted on said cap-piece, in such a manner that said pin projects into the central recess 22 formed in said block.

The said pressure plate has a marginal re-inforcing rib 23 which is provided with apertures $a$ for the reception of a butterfly bolt 24 preferably having a butterfly head. An oval master adapter member 25, having a horizontal lug 26 and a depending marginal depending flange 28, is adapted to be fitted into the pressure plate, the latter having an inner marginal oval recess B adapted to snugly receive the same, and to be rigidly retained in position in such recess when the screw 24 is threaded into the registering tapped recess $b$ in the lug 26. The reference numeral 29 designates bolts which are adapted to be inserted in the slots 6 and 9 when the same are brought into registry with each other, and 30 designates knurled nuts carried thereby. An oval retainer ring 31, having curvilineal or arcuate inner face 32, is adapted to snugly fit within the master adapter and to snugly engage the adjacent margin $c$ of the blank C during the entire stretching or forming operation and while the margin of the blank is firmly gripped as hereinafter explained between the platen and the pressure plate as a result of the nuts 30 having been screwed home.

In order to form the crown of a helmet such as illustrated in the drawings of the apparatus described herein, a forming block of the desired shape and size is mounted on the cap-piece 18 while the latter is in its uppermost position so that such block will be at the level of the dot-and-dash lines in Figure 3. Then the jack is released to allow the descent of the plunger and the forming block supported thereby into the position shown in Figure 1. The nuts 30 having been unscrewed and the bolts 29 having been removed from the registering slots 6 and 9, the pressure plate is then raised to a vertical position or at least sufficiently high to admit of the positioning of a blank on the platen in such a manner that it spans the aperture 7 and the margin thereof extends evenly beyond the same a sufficient distance to admit of it being engaged by both the platen and the pressure plate when the latter is lowered into a horizontal position. Thereupon, while holding the blank taut to avoid the possibility of any wrinkles developing therein, the pressure plate is lowered to a horizontal position and the bolts 29 replaced in said registering slots. The nuts 30 are then screwed home so as to exert sufficient pressure on the margin of the blank which projects between it and the platen to prevent any wrinkling of the blank while admitting of the limiting movement of the margin thereof during the pressing operation. Strange as it may seem, the margin of the blank will actually increase in thickness in said pressing operation, due to the flow of the material in the margin of the blank as it is slowly contracted during the formation of the desired shape and consequently, if a light pressure is applied to the blank as aforesaid when originally positioned between the pressure plate and the platen, the pressure exerted thereon by these two members will at all times during the pressing operation be sufficient to maintain engagement between the same and the margin of the blank even though an extremely high pressure may be exerted upon the forming block 21 by the plunger 13. When the blank has been positioned as above explained, the jack is then operated to slowly force the forming block upwards until it attains the dotted line position indicated in Figure 3. Such elevation of the block 21 completes the formation of the desired crown or shape and serves to firmly wedge it between the retainer ring and such block so that it is then possible, following the unscrewing of the nuts 30 and the removal of the bolts 29, to release the grip of the pressure plate 9 upon the margin of the crown and elevate the pressure plate into a vertical position without in any way affecting the grip of the retainer ring on the formed crown and thereupon the block 21 and the newly formed shape carried thereby can be bodily lifted off the cap-piece 18 and removed to a dryer, where the crown may be allowed to dry out and take a permanent set, all in the well-known manner, while in the meantime the machine can be operated to repeat the aforesaid cycle of operations and produce additional crowns as rapidly as the time required to complete such cycle of operations will admit. Usually, it is desirable to trim off that portion of the shaped form which projects beyond the bottom of the retainer ring.

The provision of the master adapter member renders it possible to easily vary the size of the crown to be shaped in the machine within quite a variety of sizes merely by inserting an adapter of a different size while the retainer ring enables one, as above explained, to bodily remove the forming block with the newly formed shape thereon and immediately again use the machine to form another shape. As a consequence, the machine can be maintained in virtually continuous operation, irrespective of the fact that it requires from 10 minutes in the case of many plastics to some twenty four hours in the case of leather for the formed shape, after being removed from the machine, to dry out and take a permanent set.

As is apparent from the foregoing, the number of different master adapter members required will correspond to the number of different full sizes of shapes to be made, whereas the number of retainer rings and forming blocks required will correspond to the total number, plus one, of formed shapes in the dryer.

The mere saving in time alone will range from a minimum of about 10 minutes for each finished shape to some twenty four hours depending, as above explained, upon the character of the material from which the crown is made.

Owing to its simplicity and compact size, my improved apparatus is not only extremely cheap to construct but it requires only a minimum of labor to produce a large output of crowns of varying sizes and withal the apparatus is unusually fool-proof because of the few moving parts and its sturdy construction.

The curvilineal or arcuate face 32 of the retainer ring insures that the stretching operation will not result in tearing or marring the material of the blank in the area thereof which is in contact with such face and also especially functions to firmly wedge the ring against the finished crown so long as it remains on the forming block.

The hinges A and the co-operating stop elements A' not only serve to admit of the pressure plate being elevated into an open position, such as indicated in dot-and-dash lines in Fig. 1, to thereby permit the removal of the forming block or mold, the forming ring and the formed shape wedged therebetween when it is desired to transfer the same to a dryer but such hinges also function to insure the centering of the forming block within the forming ring 31 mounted in the adapter member 26 when the later is adjustably mounted in the pressure plate and such block is being forcibly projected therethrough. Moreover, since the respective leaves of the hinges A are readily separable from each other merely by lifting the upper one off the other leaf, the pressure plate can be quickly removed from the machine and replaced by another carrying a master adapter of another size or shape than that accommodated by the pressure plate so removed.

It will of course be understood that my improved apparatus may constitute an attachment for a standard hydraulic or other press in lieu of incorporating therein a jack and co-operating plunger element in the manner herein described.

Various modifications of the foregoing construction and method of operation may be made without departing from the spirit of the invention as embraced within the scope of the appended claims.

Having thus described my invention, what I claim is:

1. In an apparatus for forming hats or other cupped articles, the combination comprising a supporting framework, a platen mounted thereon having a relatively large central aperture, a pressure-exerting plunger associated with the platen, means co-operating with said platen for retaining taut thereon, in pre-selected position, a blank of material from which an article is to be shaped, an annular, marginally recessed adapter member carried by said latter means, a forming block carried by said plunger, a retainer ring member adapted to fit into said recessed adapter and having a central aperture substantially of the same perimeter and shape as the external perimeter and shape of the cupped portion of the formed article at the base thereof, the inner face of said retainer ring member being transversely curvilineal to admit of the sliding of the portion of the blank in contact therewith over such curvilineal portion, and means for actuating said plunger and thereby causing the forming block to be projected through said platen and retainer ring, when the latter is positioned in said adapter, to form a blank carried on said platen to the shape desired.

2. In an apparatus for forming hats or other cupped articles, the combination comprised of a supporting framework, a platen mounted thereon having a relatively large central aperture, an associated pressure plate also having a central aperture generally similar to the other aperture, an annular adapter member mounted in said pressure plate and extending along the margin of its said central aperture, a retainer ring element centrally mounted in said adapter and having a transversely curvilineal inner face to admit of the sliding of the portion of the blank in contact therewith thereover, means for causing said platen and pressure plate to maintain in a taut condition a blank of material inserted therebetween, a plunger member disposed below and centrally of the aperture in the platen, a forming block supported by said plunger and movable therewith and means for actuating said plunger.

3. In an apparatus for forming hats or other cupped shapes, the combination comprising a supporting framework, a platen mounted thereon having a relatively large central aperture, an opposing pressure-exerting plunger, a removably mounted forming block of a size to pass through said aperture and disposed in the path of movement of said plunger, means associated with said platen for gripping the entire margin of a blank of material to be shaped by said forming block sufficiently to retain the central portion of the blank taut during the pressure stroke of the said plunger, and a retainer ring removably mounted independently of the platen for firmly retaining the formed shape in its final stretched condition on the forming block when the margin of the blank is released from engagement by the gripping means and after its removal from the said apparatus, until permanently set, said retainer ring having a transversely curvilineal inner face to admit of the sliding of the portion of the blank in contact therewith thereover.

4. In an apparatus for forming hats or other cupped shapes, the combination with a pressure-exerting plunger, of opposing pressure-reaction means having a relatively large central aperture, associated means for gripping the entire margin of a blank to be formed during the forming thereof, a forming block disposed in the path of said plunger and removably mounted independently of said pressure-reaction means, wedge-like retainer means of substantially annular shape extending around the entire margin of the aperture in said pressure-reaction means and removably mounted thereon for retaining a formed shape in its final stretched condition on said forming block until finally set following the release of the margin of the blank from the grip of the pressure-reaction means and bodily removable with the formed shape from the apparatus following the completion of the pressure-stroke of the plunger, said retainer means having a transversely curvilineal inner face to admit of the sliding of the portion of the blank in contact therewith thereover, and means for effecting a pressure-stroke of the plunger.

5. In an apparatus for forming hats or other cupped shapes, the combination with a pressure-exerting plunger of a platen, a co-operating pressure plate, means for effecting the pressure-engagement of the platen and pressure plate with the margin of a blank to be formed to the desired shape when the same is interposed therebetween, a substantially annular adapter member mounted marginally of the central aperture in one of said platen and pressure plate members, a substantially annular retainer element mounted marginally of the adapter member and readily separable therefrom having a transversely curvilineal inner face to admit of the sliding of the portion of the blank in contact therewith thereover, a forming block mounted on the plunger and of a size to admit of its being forcibly projected through said retainer and to wedge the latter into firm engagement with a blank of material formed into the desired shape by said forming block after it has been so interposed between the platen and the pressure plate.

6. In an apparatus for shaping articles of moldable material, the sub-combination comprising a centrally apertured platen member, means associated therewith for holding taut across such aperture a blank of material to be shaped in said apparatus, a retainer ring of transversely a pre-selected size carried by said latter means having a curvilineal inner face, a forming block of a size to admit of it readily passing through said aperture and also through said retainer ring and pressure-exerting means for forcibly projecting the forming block against a blank of material spanning the aperture in said platen while so held in a taut condition and then bodily projecting the forming block and the portion of the blank engaged thereby through said retainer ring so as to cause the same to become firmly wedged between the retainer ring and the forming block.

EDWARD CAIRNS.

REFERENCES CITED

The following references are of record in the file of this patent:

UNITED STATES PATENTS

| Number | Name | Date |
| --- | --- | --- |
| 58,391 | Doubleday | Oct. 2, 1866 |
| 406,214 | Harsin | July 2, 1889 |
| 426,784 | Easton | Apr. 29, 1890 |
| 485,349 | Marshall | Nov. 1, 1892 |
| 531,518 | Dunham | Dec. 25, 1894 |
| 665,068 | Cuming | Jan. 1, 1901 |
| 863,375 | Garner | Aug. 13, 1907 |
| 1,018,680 | Reitz | Feb. 27, 1912 |
| 1,541,997 | Page et al. | June 16, 1925 |
| 2,217,906 | Hunter | Oct. 15, 1940 |
| 2,363,982 | Meltzer | Nov. 28, 1944 |
| 2,424,525 | Wells | July 22, 1947 |